May 15, 1928.
T. S. WIKOFF
UNIVERSAL JOINT
Filed Oct. 8, 1926
1,670,175
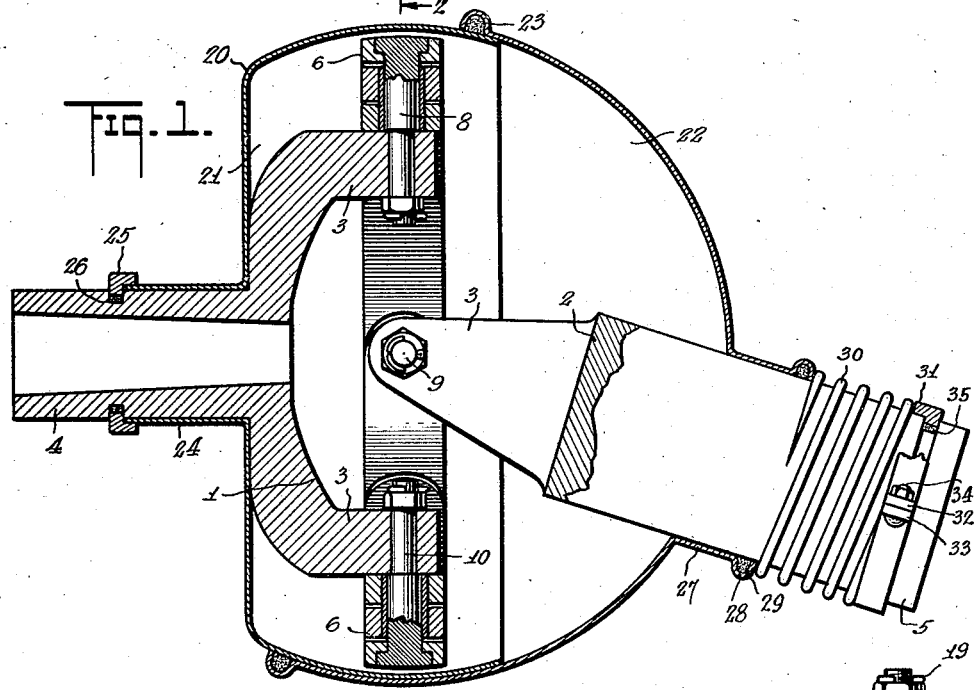
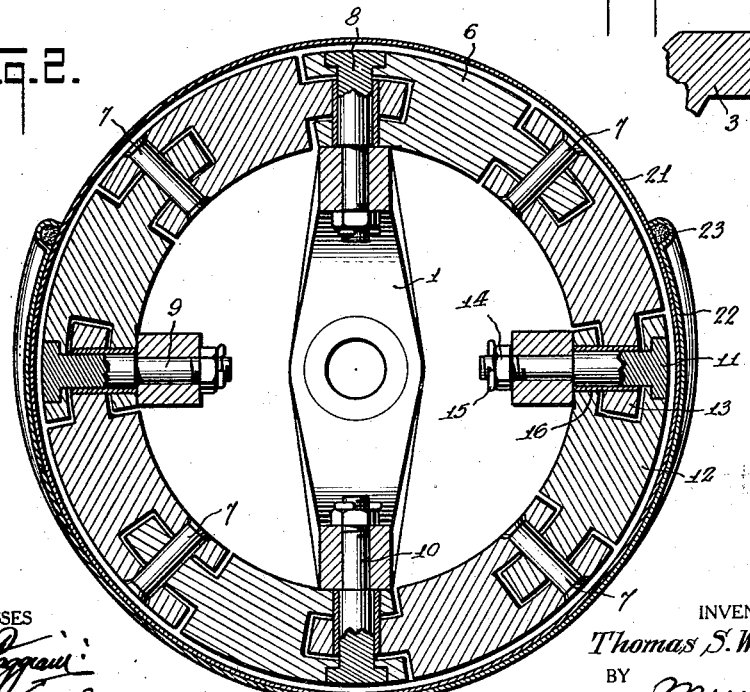
WITNESSES
INVENTOR
Thomas S. Wikoff.
BY
ATTORNEYS Patented May 15, 1928.

1,670,175

UNITED STATES PATENT OFFICE.

THOMAS SEXTON WIKOFF, OF PLAINFIELD, NEW JERSEY.

UNIVERSAL JOINT.

Application filed October 8, 1926. Serial No. 140,319.

This invention relates to universal joints and has for an object to provide an improved construction wherein the two parts of the joint are connected through the instrumentality of a ring.

Another object of the invention is to provide a universal joint having a pair of coacting forks and an articulated ring connected to the forks so as to transmit power from one fork to the other when the shanks of the forks are at the same angle or some other angle.

A still further object of the invention is to provide a universal joint wherein the parts are so connected together as to properly transmit power while permitting a limited motion toward and from each other.

In the accompanying drawing—

Figure 1 is a longitudinal vertical sectional view through a joint disclosing an embodiment of the invention.

Figure 2 is a sectional view through Figure 1 on line 2—2.

Figure 3 is a detail fragmentary sectional view disclosing a modified construction of fork.

Referring to the accompanying drawing by numerals, 1 and 2 indicate the two yokes, each of said yokes being provided with a pair of arms 3 and with shanks 4 and 5. Associated with the yokes 1 and 2 is a ring 6 which is composed of a number of links pivotally connected together by suitable pintle pins 7. Certain of the links are pivotally connected together by the respective journal pins 8, 9, 10 and 11. These journal pins are mounted in the respective links 12 and extend through the reduced extension 13 of adjacent links. These pins also extend through the various arms 3 and are locked to these arms by a suitable nut 14 held against accidental removal by a cotter pin 15. If desired, a sleeve 16 could be provided for reducing the friction and for taking up the wear. Instead of having removable separate pins 8 to 11 inclusive, the various arms 3 could have integral pins 17 provided with suitable nuts 18 and cotter pins 19. The particular pin used may be varied but it is essential that the arms of the different yokes shall be connected through links forming an articulated chain whereby power may be submitted from one yoke to the other through the ring. Also it will be noted that the ring 6 is mounted exteriorly of the yokes but if desired, it could be arranged interiorly and function in the same manner. Also, preferably the joint is caused to propagate in grease, this action being permitted by reason of the casing 20 which is divided into sections 21 and 22, section 22 slidingly fitting over part of section 21 and made grease-tight by a suitable packing 23. Section 21 is provided with an annular sleeve 24 snugly fitting shank 4 and connected thereto by a clamping ring and abutment 25 which is provided with a packing 26 to prevent leakage. Section 22 is also provided with a neck or sleeve 27 carrying a packing 28. The packing 28 is arranged in a bead 29 which also acts as an abutment for the spring 30 which acts against this bead or abutment and against the ring 31. It will be noted that the ring 31 is provided with ears 32 and 33 whereby the bolt 34 may be used for firmly clamping the ring in place against the contact 35. The ring 25 is of the same structure as ring 31 and is held in place in the same way whereby the sleeve 24 is firmly clamped in place.

In differentials used in some places, as for instance, in automobiles, not only must a differential structure be provided but also the driven shaft must be splined or otherwise slidingly keyed to part of the differential in order to take care of the up and down movement of the rear end of the automobile, which by an up and down movement, varies the effective distance between the parts. In the present structure, the articulation of the parts of the ring 6 will permit the shank 5 to move axially away from shank 4 for an appreciable distance and still maintain an operative connection through ring 6 and associated parts.

What I claim is:

1. A universal joint comprising means acting as a pair of yokes, each yoke having a shank, a ring formed of articulated sections, said ring being mounted on the arms of the yokes and exteriorly thereof, and means for pivotally connecting certain of said sections with the respective arms of the yokes, said means including journal pins rigidly secured to the arms of the yokes and loosely journaled in said ring.

2. A universal joint comprising a pair of yokes, a ring provided with a plurality of articulated sections mounted on the arms of the yokes exteriorly thereof, and a pin extending through certain of said articulated sections and through the arms of said yokes for pivotally connecting said sections to said arms whereby power may be transmitted from one yoke to the other and the respective yokes may have a limited movement axially toward and from each other.

3. A universal joint comprising a pair of yokes formed with shanks, a ring arranged exteriorly of said yokes, said ring being formed from a plurality of links, said links extending in a direction substantially transversely of the shanks of the yokes, and pivotally connecting means for pivotally connecting certain of said links to the arms of said yokes, there being at least one pivotal connection of the links between said arms thus permitting the yokes to move toward and from each other to a certain extent while rotating.

4. A universal joint comprising a forked driving element, a forked driven element, a ring and pivotal members for connecting said ring with said driving and driven elements, said ring being formed with a pair of articulated sections for each arm of each of said forks, and means for pivotally connecting the respective pairs of sections together to complete the ring whereby the ring is swingable adjacent the arms of the forks and intermediate the arms of the forks.

THOMAS SEXTON WIKOFF.